United States Patent
Adam et al.

(10) Patent No.: US 10,447,757 B2
(45) Date of Patent: Oct. 15, 2019

(54) SELF-SERVICE SERVER CHANGE MANAGEMENT

(71) Applicant: International Business Machines Corporation, Armonk, NY (US)

(72) Inventors: Constantin M. Adam, Norwalk, CT (US); Shang Q. Guo, Cortlandt Manor, NY (US); Brian L. Peterson, Ridgefield, CT (US); John J. Rofrano, Mahopac, NY (US); Frederick Y. Wu, Greenwich, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/831,051

(22) Filed: Aug. 20, 2015

(65) Prior Publication Data

US 2017/0054598 A1    Feb. 23, 2017

(51) Int. Cl.
*H04L 29/08* (2006.01)
*H04L 12/24* (2006.01)

(52) U.S. Cl.
CPC .............. *H04L 67/00* (2013.01); *H04L 41/08* (2013.01); *H04L 41/5054* (2013.01)

(58) Field of Classification Search
CPC ...... H04L 67/00; H04L 41/5054; H04L 41/08
USPC ................ 709/202, 219, 221, 224, 225, 246
See application file for complete search history.

(56) References Cited

U.S. PATENT DOCUMENTS

| | | | |
|---|---|---|---|
| 6,842,769 B1 | 1/2005 | Kim et al. | |
| 7,065,767 B2 | 6/2006 | Kambhammettu et al. | |
| 7,177,897 B2 | 2/2007 | Manukyan | |
| 7,191,438 B2* | 3/2007 | Bryant | G06F 8/60 |
| | | | 709/225 |
| 7,596,615 B2 | 9/2009 | Satkunanathan et al. | |
| 8,065,397 B2* | 11/2011 | Taylor | G06F 9/4411 |
| | | | 709/220 |
| 8,125,894 B2 | 2/2012 | Van Den Bosch et al. | |
| 8,140,635 B2 | 3/2012 | DiFalco | |
| 8,270,310 B2* | 9/2012 | Raleigh | G06Q 10/06375 |
| | | | 370/252 |

(Continued)

FOREIGN PATENT DOCUMENTS

WO    2010138130 A1    12/2010

OTHER PUBLICATIONS

Zheng et al.; "Automatic Configuration of Internet Services"; EuroSys '07, Mar. 21-23, 2007, pp. 219-229, Lisboa, Portugal, © 2007 ACM.

*Primary Examiner* — Michael Won
(74) *Attorney, Agent, or Firm* — Stephen R. Yoder

(57) ABSTRACT

A method is provided to eliminate many of the manual steps in a server change management process, creating a self-service experience for a change requester. The method may automatically retrieve the current state of a server; constrain the requested change to a valid, feasible specification; verify that the requested change is compliant with business policies; implement the changes automatically; and develop a knowledge base of automated change risk that is used to modify the change management business process by identifying safe changes that can be performed outside of change windows and/or during change freezes. The method can be applied to changes to physical servers, virtual servers, and servers in a cloud environment.

20 Claims, 6 Drawing Sheets

(56) References Cited

U.S. PATENT DOCUMENTS

| | | | |
|---|---|---|---|
| 8,442,958 B2 | 5/2013 | Bose et al. | |
| 8,452,860 B2* | 5/2013 | Agarwal | G06K 7/0008 709/223 |
| 8,533,337 B2* | 9/2013 | Maldaner | H04L 41/00 709/203 |
| 8,713,146 B2 | 4/2014 | Pedersen | |
| 8,745,220 B2* | 6/2014 | Raleigh | G06Q 30/016 455/405 |
| 8,908,698 B2 | 12/2014 | Aguayo et al. | |
| 2002/0100036 A1* | 7/2002 | Moshir | G06F 8/62 717/173 |
| 2005/0027714 A1* | 2/2005 | Kline | G06F 8/65 |
| 2008/0005733 A1* | 1/2008 | Ramachandran | G06F 8/65 717/168 |
| 2008/0147555 A1* | 6/2008 | Cromer | G06F 21/10 705/52 |
| 2008/0148340 A1* | 6/2008 | Powell | H04L 63/0227 726/1 |
| 2008/0155249 A1* | 6/2008 | Backof | H04B 1/0003 713/100 |
| 2011/0202413 A1* | 8/2011 | Stewart | G06Q 20/10 705/16 |
| 2012/0166642 A1* | 6/2012 | Saint Clair | H04L 67/125 709/225 |
| 2013/0007245 A1* | 1/2013 | Malik | H04L 41/0816 709/223 |
| 2013/0080619 A1* | 3/2013 | Assuncao | G06F 9/45558 709/224 |
| 2015/0236977 A1* | 8/2015 | Terayama | G06F 9/5077 709/224 |
| 2015/0341214 A1* | 11/2015 | Croy | H04L 41/0843 709/221 |
| 2016/0110668 A1* | 4/2016 | Ford | G06Q 10/0639 705/7.23 |
| 2016/0134491 A1* | 5/2016 | Cordray | H04L 41/0213 709/224 |
| 2016/0337206 A1* | 11/2016 | Bugenhagen | H04L 67/34 |
| 2016/0359872 A1* | 12/2016 | Yadav | H04L 43/04 |
| 2017/0054598 A1* | 2/2017 | Adam | H04L 41/5054 |

\* cited by examiner

SELF-SERVICE SERVER CHANGE MANAGEMENT

BACKGROUND

The present invention relates generally to the field of server management, and more particularly to server change management.

In general, server change management involves employing standardized methods and procedures for efficient handling of all changes. A change refers to an event that results in a new status of one or more configuration items. Specifically, a change means the addition, modification, or removal of configuration items. A change management may include a change request (e.g., a form, used to record details of the request for a change, is sent as an input to the change management by a change requestor); and/or a change schedule (e.g., a schedule that contains details of forthcoming changes and references to historical data).

Changes are required to be cost-effective and enhance business processes with a minimum risk to IT (information technology) infrastructure. Strict change management procedures have been established to comply with standards such as ITIL (information technology infrastructure library), to ensure that server configuration changes are properly authorized and performed by people with the required knowledge and skills. The primary goals of change management include: (i) minimal disruption of services (e.g., to minimize risk of server or application failure due to human error); (ii) reduction in back-out activities; and/or (iii) economic use of resources involved in the change.

Oftentimes, a systems management approach involves change management at various nodes, or endpoints (also referred to as managed endpoints). IBM Endpoint Manager is one example of a systems management software product that manages large groups of computers. (Note: the term(s) "IBM" and/or "Endpoint Manager" may be subject to trademark rights in various jurisdictions throughout the world and are used here only in reference to the products or services properly denominated by the marks to the extent that such trademark rights may exist.) Systems management refers to enterprise-wide administration of distributed systems including computer systems. Systems management is often influenced by network management initiatives in telecommunications.

SUMMARY

According to an aspect of the present invention, there is a method, computer program product and/or system for performing server change management, that performs the following operations (not necessarily in the following order): receiving a change request made by a requester; retrieving a list of endpoints based on an identity of the requester and an authorization of the requester; the change request; selecting a first endpoint from the list of endpoints, the first endpoint being an endpoint on which the change request will be performed; selecting a first change type from a list of available change types; retrieving a set of resource attributes of the first endpoint based on the first change type; determining a set of change parameters for the set of resource attributes; evaluating technical feasibility of the set of change parameters; evaluating compliance of the set of change parameters with a set of business policies; determining whether a change window is required for the change request; executing the change request on the first endpoint; and returning an execution result of the change request. Wherein at least the steps of determining a set of change parameters, evaluating technical feasibility, evaluating compliance, and executing the change request on the first endpoint are performed by computer software running on computer hardware.

DETAILED DESCRIPTION

Figure 1:
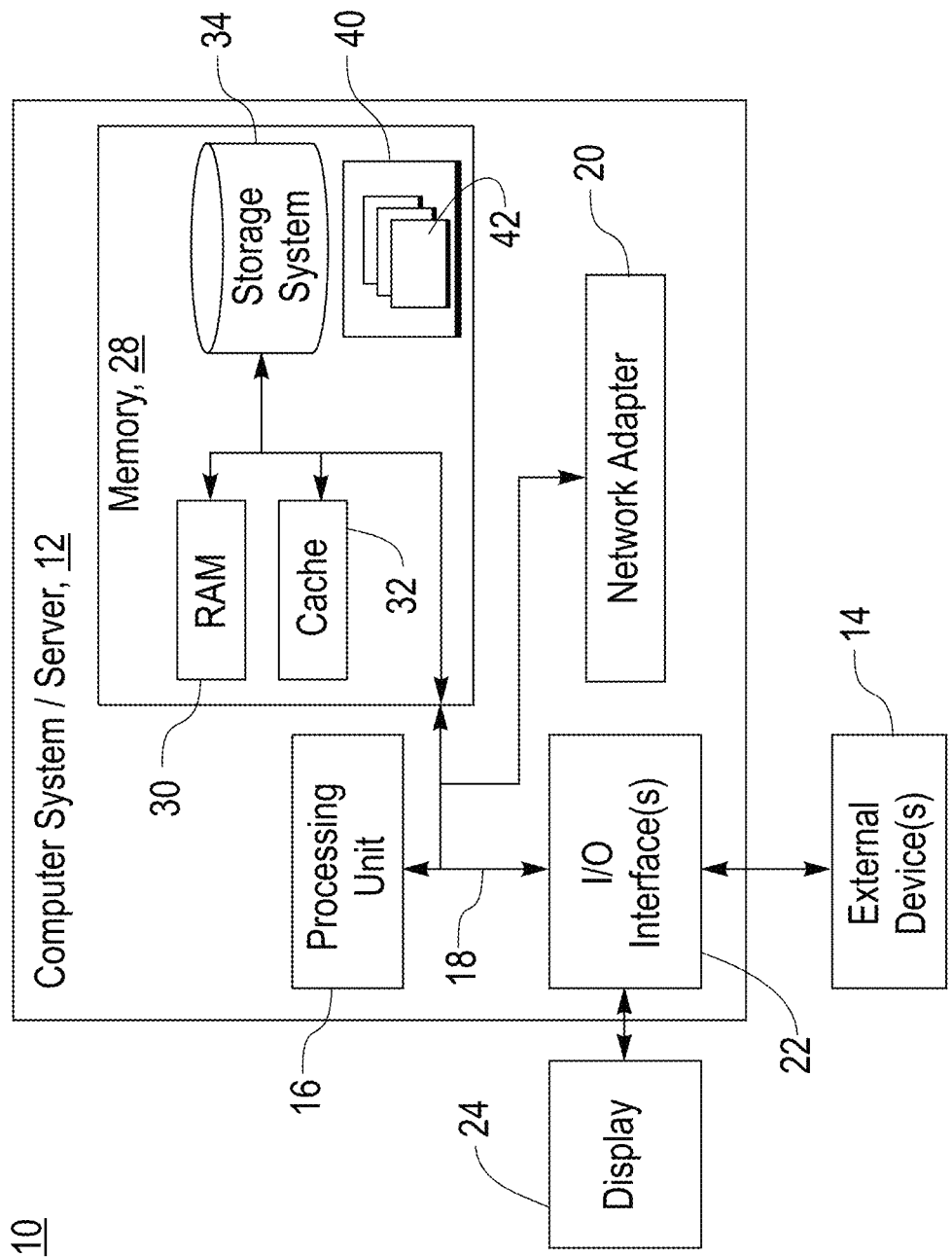
FIG. 1 depicts a cloud computing node used in a first embodiment of a system according to the present invention.

A method, system, and program product is provided to eliminate many of the manual steps in a server change management process, creating a self-service experience for a change requester. The method may automatically retrieve the current state of a server; constrain the requested change to a valid, feasible specification; verify that the requested change is compliant with business policies; implement the changes automatically; and develop a knowledge base of automated change risk that is used to modify the change management business process by identifying safe changes that can be performed outside of change windows and/or during change freezes. The method can be applied to changes to physical servers, virtual servers, and servers in a cloud environment. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
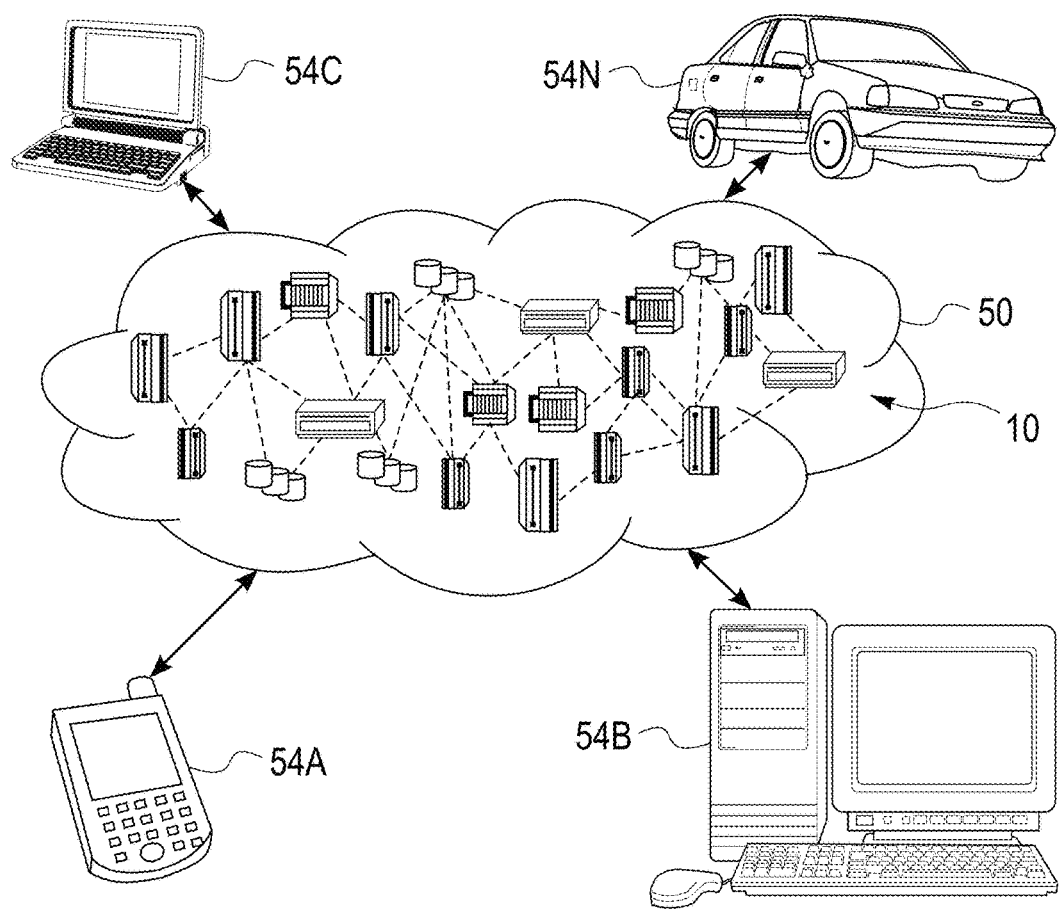
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
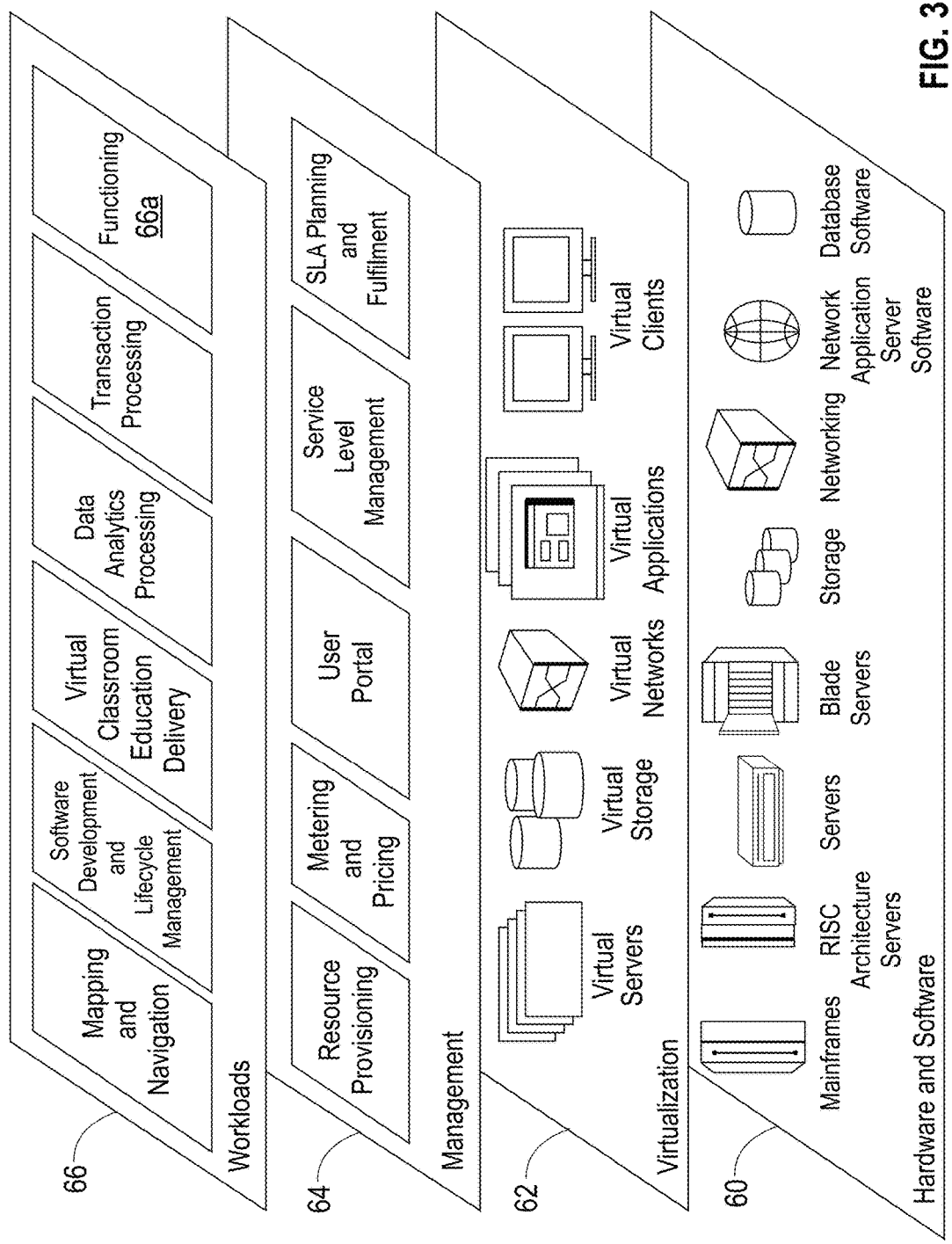
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

In many data centers, server change management is a manual process that is subject to long delays and high costs. Although the conventional process keeps risk low, it does so at the expense of responsiveness to change requirements and labor cost.

A recent analysis of change tickets showed that the average time between a request for a change and completion of the change is over 14 days. One of the reasons for this delay is the need for multiple handoffs between different people. The change requester is typically an application owner, who has neither the technical skill nor the security authorization to perform the change. As a result, the request must be dispatched to a technician for implementation. In addition, there are usually business policies that govern the types of changes that are permitted, and these policies are enforced through a series of approval steps by human users. Additional common contributors to delays are the need to perform many types of changes: (i) only during "change windows," when users understand that applications may be temporarily unavailable, and during which errors made by the technician implementing the change can be corrected, and/or (ii) only outside of "change freezes," when all risk of failure of critical applications must be avoided.

Some embodiments of the present invention are directed to an automated server change management system managing a set of managed endpoints. The automated server change management system allows a user with no prior knowledge about system administration, or about the underlying configuration management system, to make changes that are technically correct and are run in the appropriate change window, while complying with the business policies in place.

In some embodiments of the present invention, an execution engine and a business rules validator automatically check, for each change request, whether it is technically feasible, and whether it complies with a pre-defined set of business policies. The set of policies against which the change request is validated depends on the resource type(s) affected by the change. Further, the validation process determines if the requested change can run immediately, or it needs to wait for an appropriate change window.

In some embodiments, a business process manager schedules for execution (immediately or in a change window) all the changes that are validated automatically. The execution process, according to some embodiments of the present invention, consists of three steps: (i) invoking the appropriate script to make the change; (ii) recording the usage of that script, and (iii) updating the model of the managed endpoint to include the changes made by the current request in its desired state.

In some embodiments, the business process manager routes for approval each change that is not automatically approved (e.g., because it violates one or several business policies). When a member in the approvers group manually grants the requested policy exceptions, the business process manager proceeds to execute the change request. Further the business process manager ensures that the change request is added to the desired state of the endpoint model.

In some embodiments, an underlying configuration management sub-system or engine runs periodically on each managed endpoint to read its desired state and remediate any deviations from that desired state.

In some embodiments, during on boarding, the business process manager determines the owner of each managed endpoint. The owner of the endpoint gives other people access to make manual changes on a particular server. Further, the access is granted for the entire server (e.g., user A is allowed to make changes to server S), or only for certain functions (e.g., user B is allowed to make changes to the file systems and databases on server S, while user C is allowed to make changes to the CPU, memory, and the web servers on server S).

Figure 4:
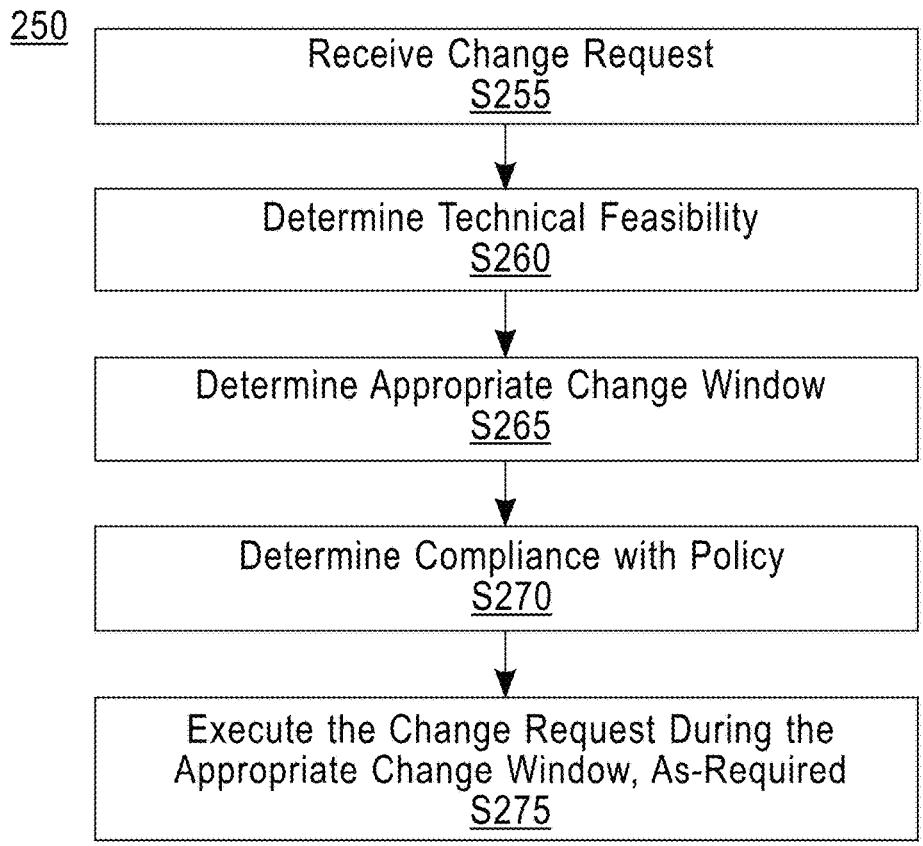
FIG. 4 is a flowchart showing a first embodiment method performed, at least in part, by the first embodiment system.
Figure 5:
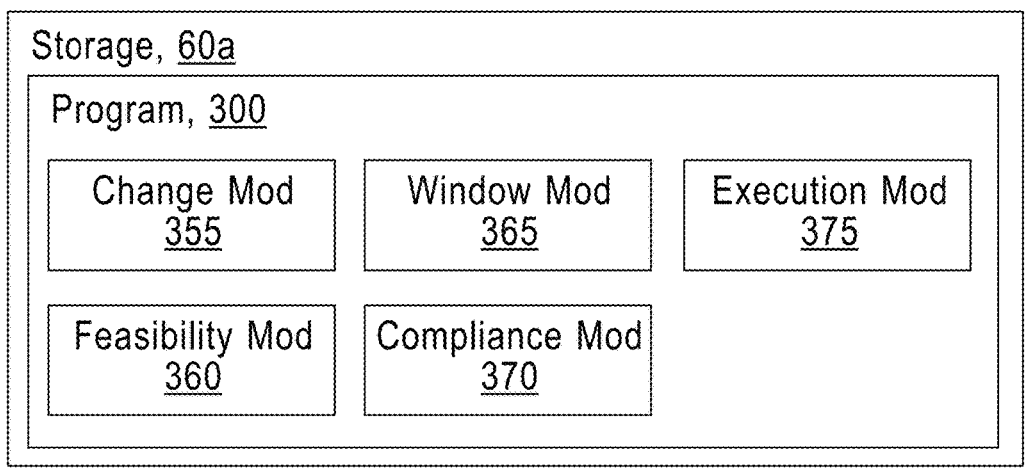
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at step S255, where change module ("mod") 355 receives a change request or a change schedule. In this example, a change request proposes an update to an existing software package. The update does not require a restart of the affected software applications, but may be made during runtime without interruption. The update requires an additional 100 Mb of data storage.

Processing proceeds to step S260, where feasibility mod 360 determines the technical feasibility of making the requested change, received at step S255. In this example, the feasibility mod determines the available storage in each of the managed computing nodes, such as node 10 (FIG. 1). Upon determining that each node targeted for the requested change has sufficient storage, the feasibility mod authorizes the change. Where storage or other technical criteria are not met, feasibility mod reports to a system administrator that the change request cannot be satisfied due to particular technical reasons. As discussed in more detail below, in Section III of this Detailed Description, reporting actions and subsequent approvals may be handled in various ways. In this example, a receipt of a change request and subsequent automated execution of the change request is presented. Alternatively, various administrative inputs override or modify technical and/or policy-based limitations encountered by this automated process.

Processing proceeds to step S265, where window mod 365 determines whether the change proposed in step S255 requires a particular change window for execution. That is, some changes require that the applications being updated are temporarily unavailable to users. In this example, the application does not require a restart. Where a restart is required, or other change window must be established, the window mod reports that a change window is required. Reporting is performed in various ways, but the end result is that an administrator must schedule a change window for the requested change to execute. Detailed discussion of this alternative scenario is found below in Section III of this Detailed Description.

Processing proceeds to step S270, where compliance mod 370 determines whether the proposed change, or change schedule, complies with existing policy. For example, the application to be updated may not be an authorized application, therefore, an update would not comply with the policy. Further, the particular update may not comply with one of various security or configuration policies established by the system owner(s). In this example, the application is authorized and the update is not flagged as any threat or otherwise discouraged by policy. Where policy concerns arise, a report is generated and appropriate policy-makers are contacted regarding the proposed change. The aspect of policy-based rejection of the requested change is discussed in more detail below, in Section III of this Detailed Description.

Processing proceeds to step S275, where execution mod 375 executes the proposed change during the appropriate change window, as-required. In this example, there is no required change window, so the execution is performed immediately and automatically. Alternatively, the execution mod waits for authorization of the change by a system administrator. Alternatively, the execution mod awaits a particular time designated as the change window for executing the change requested in step S255.

III. FURTHER COMMENTS AND/OR EMBODIMENTS

Figure 6:
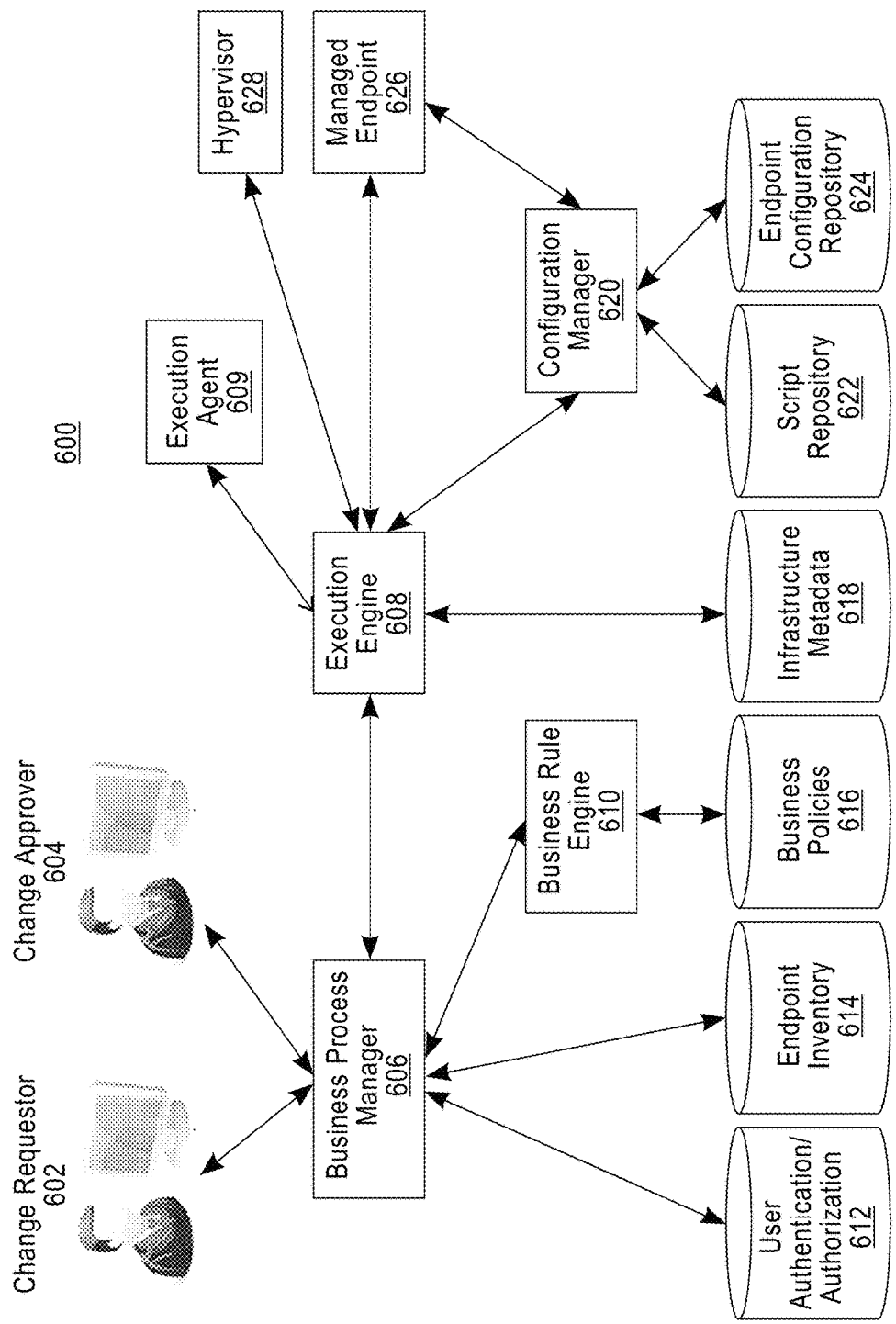
FIG. 6 is a logical diagram of an illustrative system according to one embodiment of the present invention.

Referring now to FIG. 6, a logical diagram of illustrative system 600 according to one embodiment of the present invention is depicted. As shown, system 600 comprises change requester 602; change approver 604; business process manager 606; execution engine 608; execution agent 609; business rule engine 610; user authentication/authorization 612; endpoint inventory 614; business policies 616; infrastructure metadata 618; configuration manager 620; script repository 622; endpoint configuration repository 624; managed endpoints 626; and hypervisor 628. Change requester 402 and change approver 404 may be, for example, local computing devices used in a local area network (LAN), or in a cloud computing environment. The devices may be, for example, a personal digital assistant (PDA), a cellular telephone, a desktop computer, a laptop computer, and/or an automobile computer system. The remaining components of system 600 may be, for example, one or more cloud computing nodes, such as node 10 (FIG. 1).

Figure 7:
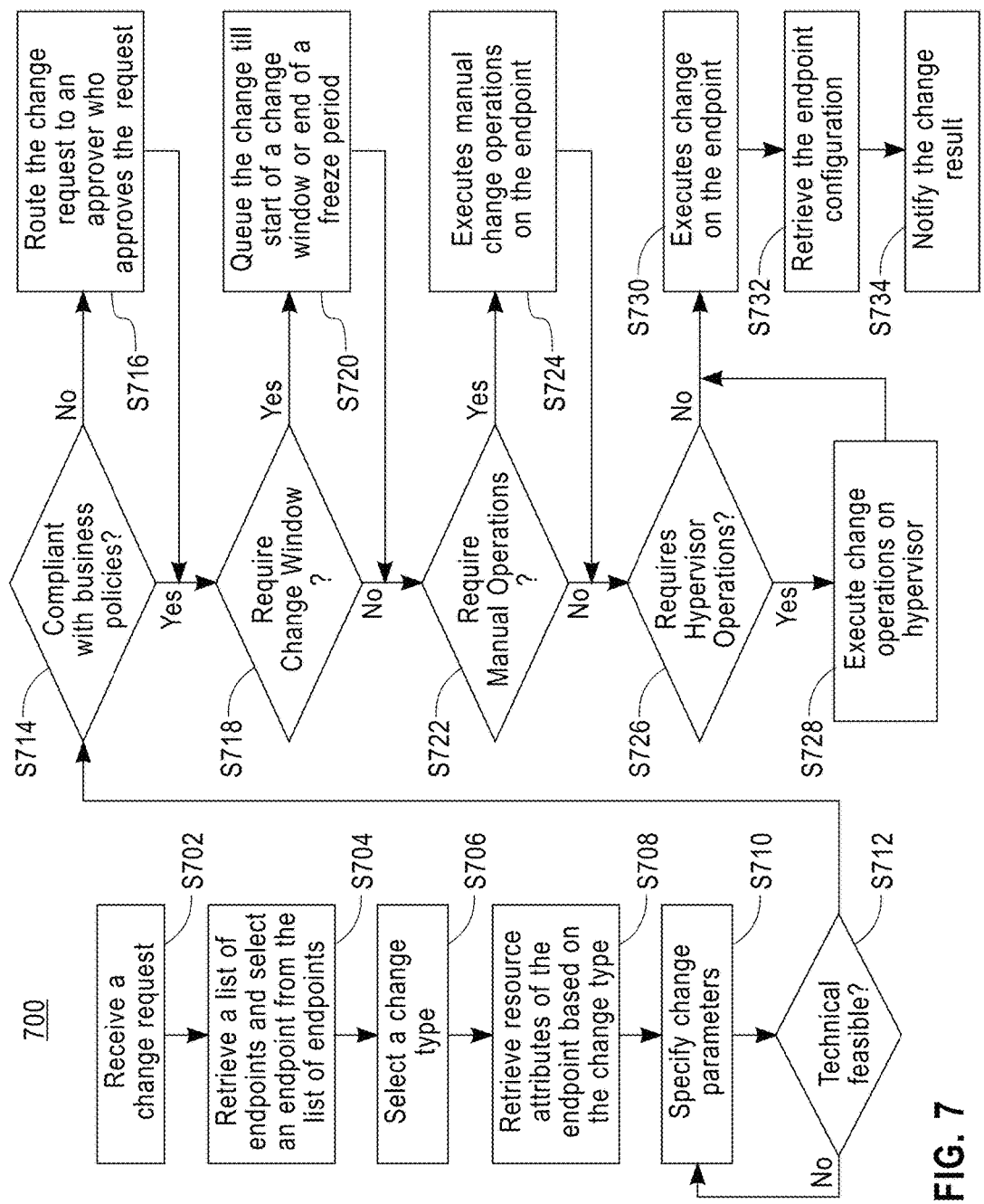
FIG. 7 is a flowchart showing a second embodiment method performed, at least in part, by the illustrative system.

FIG. 7 shows flowchart 700 depicting a method performed, at least in part, by illustrative system 600. This method and associated software will now be discussed, over the course of the following paragraphs, with extensive reference to FIG. 7 (for the method operation blocks) and FIG. 6 (for the software blocks).

Once the change type is selected, the business process manager invokes the execution engine to retrieve from the configuration manager the endpoint resource attributes relevant to the change. For example, if the request is for increasing the file system size, the business process manager will retrieve for the endpoint the list of file systems and their characteristics.

Next the Requester is required to specify the details of the change. In the case of file system size, the Requester simply enters the desired new file system size. The Business Process Manager invokes the Execution Engine to determine technical feasibility; e.g. whether there is enough free space on the storage device. If so, the Business Process Manager invokes the Business Rules Engine to determine whether the request is compliant with all business policies and whether the change type requires a change window. If a change window is required, then the change will be queued for execution during the next change window.

Either immediately, or upon start of a change window, Business Process Manager determines, based on the type of change, whether any manual execution steps are required. If so, a Change Executor is notified and the Change Executor performs the required manual steps. After the Executor indicates completion of manual steps, the Business Process Manager invokes the Execution Engine to ascertain whether the change type requires actions on the Hypervisor. If so, the Execution Engine sends instructions to the Hypervisor. The execution engine also sends the change parameters to the Configuration Manager. The Execution Engine also invokes the change execution agent on the Managed Endpoint to retrieve the change script and parameters from the Configuration Manager. The execution agent executes the requested change on the Managed Endpoint, and upon completion the Execution Engine initiates a refresh of configuration information from the Managed Endpoint, which updates the Endpoint Configuration Repository. Finally, the Execution Engine sends the change completion status to the Business Process Manager, which notifies the Requester. (Note that some change types may require multiple interleaved manual and automated steps, including manual steps after completion of all automated actions. Business Process Manager coordinates such activities.)

If the change request is not compliant with business policies, Business Process Manager routes the request to a Change Approver. The Change Approver views the details of the request by logging in to the Business Process Manager. If the Approver indicates approval, the request proceeds with the process flow. If approval is denied, the Requester is notified and allowed to either modify the request or cancel it.

Now, with regard to the FIGS. 6 and 7 and the corresponding reference numbers, processing begins at operation S702, where business process manager module ("mod") 606 receives a change request from a change requester. In this example, business process manager 606 receives a change request from change requester 602. The change requester is typically an application owner who is responsible for the servers (i.e., managed endpoints) that run the application. During the on-boarding process (i.e., a requester logs into a server), the requester is granted authorization to request changes for the endpoints associated with the application. The authentication process is performed by retrieving identification information from user authentication/authorization 612 by business process manager 606.

Processing proceeds to operation S704 where business process manager mod 606 retrieves a list of managed endpoints 626 and selects an endpoint from the list. In this example, upon logging into the business process manager component, the change requester is shown a list of the requester's managed endpoints for which the requester can make changes. The list is retrieved by the business process manager based on the identity and authorization of the requester from endpoint inventory 614. From such list, the requester select a target endpoint to which a change will be made.

Processing proceeds to operation S706 where through business process manager mod 606 the type of change to be made is selected. In this example, after the requester selects the endpoint that is the target of the change, the requester selects the type of change from a list of available change types. The list of change types includes, but does not limit to, changing the size of a file system, changing the number of CPUs, and amount of memory.

Processing proceeds to operation S708, where business processor manager mod 606 invokes execution engine mod 608 to retrieve relevant endpoint configuration. In this exemplary embodiment, once the change type is selected, business process manager 606 invokes execution engine 608 to retrieve from configuration manager 620 the targeted endpoint resource attributes relevant to the selected change type. Configuration manager mod 620 accesses endpoint configuration repository 624 to obtain the targeted endpoint resource attributes. For example, if the request is for increasing the file system size, business process manager 606 will retrieve for the targeted endpoint the list of file systems and their characteristics.

Processing proceeds to operation S710, where execution engine mod 608 requests the change requester specify the details of the change. For example, in the case of file system size, change requester 602 is required to enter specific parameters, e.g., a desired new file system size.

Processing proceeds to operation S712, where execution engine 608 determines technical feasibility for the requested change. In this example, business process manager 606 invokes execution engine 608 to evaluate the change feasibility, e.g. whether there is enough free space on a storage device by accessing infrastructure metadata 618.

If "NO" is selected from operation S712, processing proceeds back to operation S710 where execution engine mod 608 requests the change requester specify again the details of the change.

If "YES" is selected from operation S712, processing proceeds to operation S714 where business rule mod 610 evaluates change compliance with business policies. Business rule engine 610 determines whether the requested change is compliant with all business policies, for example, by accessing business policies 616. Additionally, in some embodiments of the present invention, business rule engine 610 evaluates change parameters including: (i) server ID, change type, resource type, resource name, attribute name, attribute old value, attribute new value, and dependency.

If "NO" is selected from operation S714, processing proceeds to operation S716 where through business process manager mod 606 a change approver evaluates the requested change to decide whether to approve the request. If the change request is not compliant with business policies, business process manager 606 routes the request to change approver 604. The change approver views the details of the request by logging in to the business process manager. If the approver indicates approval, the request proceeds with the process flow. If approval is denied, the requester is notified and allowed to either modify the request or cancel it. In this example, approval is granted.

If "YES" is selected from operation S714 or approval is granted from operation S716, processing proceeds to operation S718 where business process manager mod 606 determines whether the change type requires a change window. If a change window is required, processing proceeds to operation S720 where business process manager mod 606 queues the change for execution during the next change window or until the end of current change freeze period.

If "NO" is selected from operation S718, or a change window starts or the current change freeze period ends from operation S720, processing proceeds to operation S722, where business process manager mod 606 determines, based on the type of change, whether any manual execution steps are required. In this example, either immediately, or upon start of a change window, business process manager 606 determines, whether the change requires manual operations. If manual execution steps based on the change type is needed (i.e., "YES" is selected from operation S722), processing proceeds to operation S724 in which a change executor (not shown) is notified and the change executor performs the required manual steps on the target endpoint (e.g., managed endpoints 426). Alternatively, change requester 602 or change approver 604 is the change executor.

If "NO" is selected from operation S722, or upon completion of the manual steps from operation S724, processing proceeds to operation S726 where execution engine mod 608 evaluates whether the change type needs hypervisor operations. After the executor indicates completion of manual steps, business process manager 606 invokes execution engine 608 to ascertain whether the change type requires actions on the hypervisor. If "YES" is selected, processing proceeds to operation S728 where execution engine 608 sends instructions to the hypervisor, and then sends the change parameters to configuration manager 620.

If "NO" is selected from operation S726 or upon completion of the actions on the hypervisor from operation S728, processing proceeds to operation S730 where execution agent mod 609 executes changes on the target endpoint. In this example, execution engine 608 invokes change execution agent 609 on managed endpoints 626 (i.e., the target endpoint) to retrieve through configuration manager 620 the change script from script repository 622 and change parameters from endpoint configuration repository 624. The execution agent executes the change on one of managed endpoints 626.

Processing proceeds to operation S732 where execution engine mod 608 retrieves configuration from the managed endpoints. In this example, upon completion execution engine 608 initiates a refresh of configuration information from managed endpoints 626, which updates endpoint configuration repository 624.

Processing ends at operation S734 where business process manager mod 606 notifies the change requester of the change results. Execution engine 608 sends the change completion status to business process manager 606, which notifies change requester 602.

Further, in some embodiments of the present invention, some change types may require multiple interleaved manual and automated steps, including manual steps after completion of all automated actions. In such cases, business process manager 606 coordinates such activities.

In some embodiments where changes that must be executed during a change window or outside of a change freeze are queued until the window opens or freeze ends, multiple changes may be aggregated in an optimized fashion. This includes optimized sequencing of multiple changes scheduled for the same change window or for the end of a change freeze period. It may include removal of redundant or conflicting changes or steps based on a variety of conditions, such as the time of request submission, the role or identity of the submitter, and so forth. Further, it may include optimization of change sequence based on a variety of attributes, such as change type or explicit dependencies. In some embodiments, an additional operation is incorporate where, for example, business process manager mod 606 removes redundancies and optimizes the operation sequence. This step may be performed following operation S722 in FIG. 7.

Further, the queue may contain multiple changes to the same resource attributes and may be in conflict. An algorithm may be applied to resolve conflicts. For example, upon examination of the time of request submission a decision is made to ignore all but the most recently submitted change request. Alternatively, where one queued change request is to change a file system size to 9 GB, but the latest request is to change it to 13 GB, only the change to 13 GB would be executed, and the change to 9 GB will be ignored.

Further, the queue may contain multiple interdependent changes. For example, installing a new software package may require increasing the size of a file system. As another example, setting up an automatic service may require installing the service software first. An algorithm may be applied to sequence the requested changes by type. For example, it may apply all system resource changes first (e.g., memory, CPU, and storage), followed by all software package installations, then followed by all software updates, lastly followed by all service configurations.

Further, the queue may contain multiple independent changes. Such independent changes may be scheduled to be executed in any order, or in parallel.

In some embodiments of the present invention, an ability to operate in configuration maintenance mode is provided. In this mode, any changes made update a record of the desired configuration state of the managed endpoint that is stored, for example, in endpoint configuration repository 624. A repository of scripts that are used to alter configuration parameters and establish the desired configuration is maintained on, for example, script repository 622. The change execution agent on the managed endpoint runs periodically on a schedule to query the configuration values on the managed endpoint, each time comparing the actual configuration state of the managed endpoint with the desired state recorded, and automatically invoking appropriate scripts from the script repository to return the managed endpoint to the desired state. Further, business policies are applied, for example, policies that govern whether a change that restores a desired value can be executed outside of a change window or inside a change freeze. Discrepancies that cannot be automatically reverted (e.g., because they require manual activities or no script is available) are used to alert relevant users to take action. The discrepancies may be due to unauthorized changes. Additionally, manual change steps executed also update the desired state, ensuring that they are not identified as discrepancies to prevent automatic reversal of manually executed changes. If desired, the business process manager may enable or disable maintenance mode operation, for example, based on change windows, freeze windows, and associated business policies.

In some embodiments of the present invention, an ability to plan resource capacity for future changes is provided. Such embodiments allow a change requester to request future changes and reserve resources. For example, a resource pool may be added to system 600 in FIG. 6 to store a repository of resources to maintain a schedule of projected resource availability, thus allowing a requester to schedule a future change, check for availability of resources on a scheduled date, and/or reserve resources for a change request. Resources may include memory, CPU, storage, and/or other devices. Further, the resource pool may alert a requester/server administrator of shortages of pooled resources at future times based on the new request and currently planned usage, thus enabling the server administrator to plan for augmenting resources in resource pools based on a predicted resource demand.

In some embodiments of the present invention, a system is provided to integrate with a ticketing work order system, allowing automatically opening, updating, and/or closing of work tickets in legacy ticketing systems. Many data centers have established work order systems that track all work performed on managed endpoints. Some embodiments can work with established ticketing systems by automatically creating a new change ticket when a requester submits a change request, automatically updating ticket status as the request progresses through approval and execution steps, and automatically updating ticket status to "complete" after the change has been fully executed. For example, some embodiments can invoke application program interfaces (APIs) into a ticketing system that keeps official, centralized records of all work performed on endpoints. When a change request is submitted, an API is invoked that creates a new ticket, including all necessary change details. When the request is automatically validated or manually approved, the invoked API updates the status of the ticket along with other information such as the identity of the approver. When the change is completed, the invoked API updates the ticket status to "closed." Further, systems in some embodiments may be used as a "back end" to implement changes if an established ticketing system is used for inputting change request input and can pass change parameters to the embodied systems.

Some embodiments of the present invention provide for verifying and remediating a managed endpoint before a change is made. In such embodiments, the endpoint configurations are compared with business policies and automatically brought into compliance, if necessary, by invoking scripts appropriate to changing the non-compliant attributes.

Some embodiments of the present invention provide an ability to perform changes required by auto-scaling services. An API is included that makes change automation capability available to external callers including could computing auto-scaling services. An auto-scaling service automatically adds or removes computing resources depending on actual usage. Integration of an auto-scaling service with some embodiments of the present invention provides a means of automatically executing changes that are commonly received with the means of automatically executing human-requester-initiated changes. Such embodiments may include provisioning new virtual machines through invocation of the hypervisor API, making this capability available to the auto-scaling service as well as the capability to change resources allocated to existing endpoints.

Some embodiments of the present invention recognize the following facts, potential problems and/or potential areas for improvement with respect to the current state of the art: (i) the responsiveness to change requirements is poor with high labor cost; (ii) multiple handoffs between different people are needed; (iii) performing many types of changes is permitted only during "change windows;" and/or (iv) many types changes is performed only outside of "change freezes," when all risk of failure of critical applications must be avoided.

Some embodiments of the present invention may include one, or more, of the following features, characteristics and/or advantages: (i) eliminating the need for a technician to examine the server; (ii) eliminating the need for an approver to check the validity and feasibility of the request; (iii) eliminating the need for an approver to evaluate the change against policies; (iv) eliminating the need for a technician to type commands; and/or (v) developing a knowledge base of automated change risk that is used to modify the change management business process by identifying safe changes that can be performed outside of change windows and/or during change freezes.

Further, some embodiments of the present invention may include one, or more, of the following features, characteristics and/or advantages: (i) the ability to aggregate multiple changes in an optimized fashion; (ii) the ability to operate in configuration maintenance mode; (iii) the ability to plan resource capacity for future changes; (iv) the ability to integrate with a ticketing work order system; (v) the ability to verify and remediate an endpoint before a change; and/or (vi) the ability to perform changes required by auto-scaling services.

Further, some embodiments of the present invention may include one, or more, of the following features, characteristics and/or advantages: (i) enabling non-expert user to make server configuration changes (i.e., self-service); (ii) using technical feasibility check to automate change approval; (iii) using business policy repository and business rule engine to automate change approval; (iv) enabling business policy violation via manual approval step; (v) enabling run-time modification of change management policies; (vi) enabling region-, organization-, application-, or server-specific change management policies; (vii) executing changes on both managed endpoint and hypervisor for changes that are larger than the scope of the endpoint itself; (viii) prohibiting execution of a change that affects a server resource for which a change is already pending execution.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for performing server change management, the method comprising:
    receiving, by computer software running on computer hardware, a change request made by a requester, the requester having an identity corresponding to an authorization, with respect to server changes, to only request changes for a set of endpoints associated with an application, the set of endpoints being within an enterprise system having managed endpoints;
    identifying, by the computer software running on the computer hardware, certain endpoints of the set of endpoints, the certain endpoints being available to the requester according to the authorization for making the requested change;
    retrieving, by the computer software running on the computer hardware, a list of endpoints including the certain endpoints;
    receiving, by the computer software running on the computer hardware, a selection by the requester of a first endpoint from the list of endpoints, the first endpoint being an endpoint on which the change request will be performed;
    identifying, by the computer software running on the computer hardware, from within a set of possible change types, a subset of change types that may be performed on the first endpoint based on a governing policy;
    receiving, by the computer software running on the computer hardware, a selection by the requester of a first change type from the subset of change types;
    retrieving, by the computer software running on the computer hardware, a set of resource attributes of the first endpoint based on the first change type, the set of resource attributes being the names and characteristics of the first endpoint;
    determining, by the computer software running on the computer hardware, a set of change parameters for the set of resource attributes, the set of change parameters being adjustable values associated with the set of resource attributes;
    identifying, by the computer software running on the computer hardware, change window requirements for the first change type based on the set of change parameters;
    evaluating, by the computer software running on the computer hardware, compliance of the set of change parameters with a set of business policies;
    determining, by the computer software running on the computer hardware, that the first change type is a safe change capable of being performed outside of a change window;
    executing, by the computer software running on the computer hardware, the change request on the first endpoint without regard for the change window; and
    returning to the requester, by the computer software running on the computer hardware, an execution result of the change request.

2. The method of claim 1, further comprising:
    routing, by the computer software running on the computer hardware, the change request to a change approver for approving the change request.

3. The method of claim 1, further comprising:
    sequencing, by the computer software running on the computer hardware, the change request for execution in compliance with a change freeze period.

4. The method of claim 1, further comprising:
    determining, by the computer software running on the computer hardware, that a set of manual execution steps is required to execute the requested change according to the first change type and the set of change parameters for the set of resource attributes;
    routing, by the computer software running on the computer hardware, the change request to a change executor for performing the set of manual execution steps;
    responsive to completion of the set of manual execution steps, determining a set of actions to be executed to complete the change request; and
    executing the set of actions.

5. The method of claim 1, further comprising:
    determining, by the computer software running on the computer hardware, that a hypervisor operation is required to execute the change request when a scope of the change request applies to more than just the first endpoint within the computer system; and sending a set of instructions to a hypervisor for the hypervisor operation.

6. The method of claim 1, further comprising:

updating, by the computer software running on the computer hardware, configuration information of the first endpoint upon completion of executing the change request on the first endpoint; and storing, by the computer software running on the computer hardware, an updated configuration information of the first endpoint.

7. The method of claim 1, further comprising:

coordinating, by the computer software running on the computer hardware, an execution process of a plurality of change requests during the scheduled change windows.

8. A computer program product for performing server change management, the computer program product comprising a non-transitory computer readable storage medium having stored thereon:

first program instructions programmed to receive a change request made by a requester, the requester having an identity corresponding to an authorization, with respect to server changes, to only request changes for a set of endpoints associated with an application, the set of endpoints being within an enterprise system having managed endpoints;

second program instructions programmed to identify, by the computer software running on the computer hardware, certain endpoints of the set of endpoints, the certain endpoints being available to the requester according to the authorization for making the requested change;

third program instructions programmed to retrieve a list of endpoints including the certain endpoints;

fourth program instructions programmed to receive a selection by the requester of a first endpoint from the list of endpoints, the first endpoint being an endpoint on which the change request will be performed;

fifth program instructions programmed to identify from within a set of possible change types, a subset of change types that may be performed on the first endpoint based on a governing policy;

sixth program instructions programmed to receive a selection by the requester of a first change type from the subset of change types;

seventh program instructions programmed to retrieve a set of resource attributes of the first endpoint based on the first change type, the set of resource attributes being the names and characteristics of the first endpoint;

eighth program instructions programmed to determine a set of change parameters for the set of resource attributes, the set of change parameters being adjustable values associated with the set of resource attributes;

ninth program instructions programmed to identify change window requirements for the first change type based on the set of change parameters;

tenth program instructions programmed to evaluate compliance of the set of change parameters with a set of business policies;

eleventh program instructions programmed to determine that the first change type is a safe change capable of being performed outside of a change window;

twelfth program instructions programmed to execute the change request on the first endpoint without regard for the change window; and thirteenth program instructions programmed to return to the requester an execution result of the change request.

9. The computer program product of claim 8, further comprising:

fourteenth program instructions programmed to route the change request to a change approver for approving the change request.

10. The computer program product of claim 8, further comprising:

fourteenth program instructions programmed to sequence the change request for execution in compliance with a change freeze period.

11. The computer program product of claim 8, further comprising:

fourteenth program instructions programmed to determine that a set of manual execution steps is required to execute the requested change according to the first change type and the set of change parameters for the set of resource attributes;

fifteenth program instructions programmed to route the change request to a change executor for performing the set of manual execution steps;

sixteenth program instructions programmed to, responsive to completion of the set of manual execution steps, determine a set of actions to be executed to complete the change request; and seventeenth program instructions programmed to execute the set of actions.

12. The computer program product of claim 8, further comprising:

fourteenth program instructions programmed to determine that a hypervisor operation is required to execute the change request when a scope of the change request applies to more than just the first endpoint within the computer system; and fifteenth program instructions programmed to send a set of instructions to a hypervisor for the hypervisor operation.

13. The computer program product of claim 8, further comprising:

fourteenth program instructions programmed to update configuration information of the first endpoint upon completion of executing the change request on the first endpoint; and fifteenth program instructions programmed to store an updated configuration information of the first endpoint.

14. The computer program product of claim 8, further comprising:

fourteenth program instructions programmed to coordinate an execution process of a plurality of change requests during the scheduled change windows.

15. A computer system for performing server change management, the computer system comprising:

a processor(s) set; and a computer readable storage medium;

wherein:

the processor set is structured, located, connected and/or programmed to run program instructions stored on the computer readable storage medium; and the program instructions include:

first program instructions programmed to receive a change request made by a requester, the requester having an identity corresponding to an authorization, with respect to server changes, to only request changes for a set of endpoints associated with an application, the set of endpoints being within an enterprise system having managed endpoints;

second program instructions programmed to identify, by the computer software running on the computer hardware, certain endpoints of the set of endpoints, the certain endpoints being available to the requester according to the authorization for making the requested change;

third program instructions programmed to retrieve a list of endpoints including the certain endpoints;

fourth program instructions programmed to receive a selection by the requester of a first endpoint from the list of endpoints, the first endpoint being an endpoint on which the change request will be performed;

fifth program instructions programmed to identify from within a set of possible change types, a subset of change types that may be performed on the first endpoint based on a governing policy;

sixth program instructions programmed to receive a selection by the requester of a first change type from the subset of change types;

seventh program instructions programmed to retrieve a set of resource attributes of the first endpoint based on the first change type, the set of resource attributes being the names and characteristics of the first endpoint;

eighth program instructions programmed to determine a set of change parameters for the set of resource attributes, the set of change parameters being adjustable values associated with the set of resource attributes;

ninth program instructions programmed to identify change window requirements for the first change type based on the set of change parameters;

tenth program instructions programmed to evaluate compliance of the set of change parameters with a set of business policies;

eleventh program instructions programmed to determine that the first change type is a safe change capable of being performed outside of a change window;

twelfth program instructions programmed to execute the change request on the first endpoint without regard for the change window; and thirteenth program instructions programmed to return to the requester an execution result of the change request.

16. The computer system of claim 15, further comprising:
fourteenth program instructions programmed to route the change request to a change approver for approving the change request.

17. The computer system of claim 15, further comprising:
fourteenth program instructions programmed to sequence the change request for execution in compliance with a change freeze period.

18. The computer system of claim 15, further comprising:
fourteenth program instructions programmed to determine that a set of manual execution steps is required to execute the requested change according to the first change type and the set of change parameters for the set of resource attributes;
fifteenth program instructions programmed to route the change request to a change executor for performing the set of manual execution steps;
sixteenth program instructions programmed to, responsive to completion of the set of manual execution steps, determine a set of actions to be executed to complete the change request; and
seventeenth program instructions programmed to execute the set of actions.

19. The computer system of claim 15, further comprising:
fourteenth program instructions programmed to determine that a hypervisor operation is required to execute the change request when a scope of the change request applies to more than just the first endpoint within the computer system; and
fifteenth program instructions programmed to send a set of instructions to a hypervisor for the hypervisor operation.

20. The computer system of claim 15, further comprising:
fourteenth program instructions programmed to update configuration information of the first endpoint upon completion of executing the change request on the first endpoint; and
fifteenth program instructions programmed to store an updated configuration information of the first endpoint.

\* \* \* \* \*